United States Patent [19]

Vilhelmsson

[11] Patent Number: 4,678,273
[45] Date of Patent: Jul. 7, 1987

[54] HIGH POWER OPTICAL FIBER WITH IMPROVED COVERING

[75] Inventor: Kennet Vilhelmsson, Gothenburg, Sweden

[73] Assignee: Radians AB, Gotheburg, Sweden

[21] Appl. No.: 685,783

[22] Filed: Dec. 24, 1984

[30] Foreign Application Priority Data

Dec. 23, 1983 [SE] Sweden .................................. 8307140

[51] Int. Cl.⁴ .............................................. G02B 6/02
[52] U.S. Cl. ............................. 350/96.30; 350/96.29; 350/96.34
[58] Field of Search ............... 350/96.23, 96.29, 96.30, 350/96.34

[56] References Cited

U.S. PATENT DOCUMENTS 4,139,262  2/1979  Mahlein et al. ................... 350/96.30

FOREIGN PATENT DOCUMENTS 2442859  6/1974  Fed. Rep. of Germany .
0123801  12/1982  Japan ................................... 350/96.29
0406816  4/1975  Sweden .

Primary Examiner—Eugene R. LaRoche
Assistant Examiner—James C. Lee
Attorney, Agent, or Firm—Holman & Stern

[57] ABSTRACT

An optical fiber for transmitting high optical power and of the type having a central core portion adapted to conduct radiation, a cladding layer surrounding the core and at least one covering surrounding the cladding adapted to give an improved mechanical stability to the fiber and to damp scattered radiation wherein, in order to prevent the radiation level in any volume part of the covering from exceeding the limit at which the material of the covering is damaged, the fiber is, at least at its entrance side over a part of its length, provided with radiation resistant and radiation absorbing materials comprising a radiation resistant transmitting material with a real refractive index exceeding or close to that of the cladding, and one, or several, additional material layers of which the outermost are of heat-conducting materials, the radiation being absorbed in the outermost heat-conducting layer(s).

8 Claims, 2 Drawing Figures

HIGH POWER OPTICAL FIBER WITH IMPROVED COVERING

BACKGROUND OF THE INVENTION

1. Field of the Invention

The present invention refers to an optical fiber for transmitting high optical power and of the kind comprising a central portion, the core, adapted to conduct radiation, and a layer, the cladding, surrounding the core and at least one covering surrounding the cladding and adapted to give an improved mechanical stability to the fiber and to damp scattered radiation.

2. Description of the Prior Art

The spreading of optical radiation in a material or its reflection in interfacial surfaces between materials are described by the refractive index of the materials. The refractive index consists of a real portion n and an imaginary portion k. If the difference in refractive indexes is very high between two materials there will be a considerable reflection in the interfacial surface between the materials.

The imaginary portion k describes the absorption in the material, so that a great value of k gives a strong absorption.

For materials having a low damping (a negligible k) a total reflection can be obtained in an interfacial surface between two materials. If the material in which the radiation spreads has a higher refractive index n than the material against which the radiation is reflected. A condition for this is that the angle of incidence towards the surface is sufficiently small. In interfacial layers where the refractive index is not suddenly changed but is changed from a high to a low level over a certain distance, the radiation will turn in this interfacial layer. Also in this case a total reflection can be obtained towards the interfacial layer.

In an optical fiber this is used for keeping the radiation limited to the core of the fiber. A condition for this is that one choses the refractive index of the core $n_1$ somewhat higher than for the cladding $n_2$, $n_1 > n_2$, or that the core has a varying refractive index with a maximum in the central part of the core.

When the radiation enters the fiber it is focused towards the core. A part of the radiation will, however, always leak out into the cladding. Further, there will always be a leakage of radiation along the entire length of the fiber, caused by different types of inhomogeneities in the core material. This leak radiation is always a disadvantage in the transmission of information, and therefore this leak radiation conducted further along the fiber should be avoided. This can be achieved by applying a radiation absorbing covering, a cladding covering of e.g. silicon rubber, outside the cladding. The cladding covering will absorb all leak radiation which for any reason will reach the cladding. If one tries to use such a fiber for transmission of high optical power, e.g. laser radiation, for working of material, the radiation which has leaked out into the cladding will be absorbed in the cladding covering and melt and/or ignite the covering.

Optical fibers for transmitting high power have up to now been used commercially only in the medical field. These have mostly been argon ion lasers with a power of some W and continuosly radiating Nd-YAG-lasers of up to 100 W, where YAG denotes a crystal with a chemical composition $Y_3Al_5O_{12}$.

In certain cases the fibers have been designed in a special way in order to avoid damage at the end surfaces. It is for example known to design the core with an increasing diameter at the ends, see e.g. U.S. Pat. No. 3,843,865. The quality of the fibers today is however so high, that damage at the end surfaces is not a great problem. In cases where the fibers have not been designed in any special way relatively thick fibers, e.g., 0.6 mm in diameter, have been used in order that all radiation enters the cores of the fibers and minimize the leak radiation. This involves the disadvantages that the radiation cannot be focused as well as when a thinner fiber is used. The fiber will also be difficult to handle. For medical purposes this is often no disadvantage since there are mostly "large" surfaces (of the size 1 mm) which are radiated.

In the Swedish Patent Specification No. 406 816 there is described a light conductor with improved mechanical strength. According to one embodiment the light conductor comprises a fluid core with three coverings, wherein the refractive index of the second covering is greater than that of the first (inner) covering. The second covering comprises a strongly light absorbing material. This light conductor cannot be used for transmitting high optical power, as the leak radiation absorbed by the covering quickly would melt and/or ignite the covering. The publication does not describe the problems associated with the transmission of high optical power, but the object of this known light conductor is only to provide an increase of the mechanical strength.

The German Offenlegungsschrift No. 2 442 859 describes a light conducting fiber provided with a filter in the form of several dielectric layers in order to selectively remove certain radiation. These layers have a thickness of the size wave-length and are attached directly against the core of the fiber. It can thus be regarded that they replace the cladding in a convention optical fiber. The layers are very sensitive to high power and this light conducting fiber is not intended to transmit high optical power.

BRIEF SUMMARY OF THE INVENTION

The object of the present invention is to provide an optical fiber of the type mentioned above, which makes it possible to use high pulse effects, for example of the size 100 kW during some microseconds, 10 kW during some milliseconds and some hundred W continuously. This has been provided by the fact in order to prevent that the degree of radiation in any volume part of the covering from exceeding the limit at which the material of the covering is damaged the fiber is at least at its entrance side over a portion of its length provided with a radiation resistant and radiation absorbing means comprising a radiation resistant transmitting material arranged outside and in contact with the cladding and having a real refractive index greater than, or close to, the refractive index of the cladding, and further comprising one or several additional material layer or layers of which the outermost comprises a heat conducting means, wherein the radiation is absorbed in the outermost layer or layers.

BRIEF DESCRIPTION OF THE DRAWINGS

The invention will now be described in greater detail with reference to an embodiment shown in the accompanying drawing wherein.

DETAILED DESCRIPTION

Figure 1:
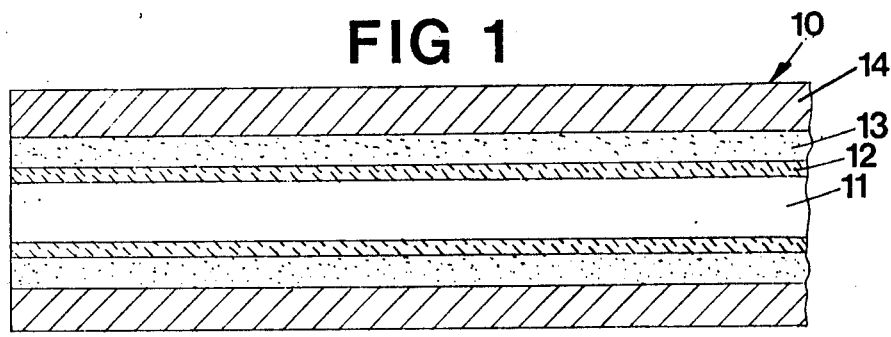
FIG. 1 is a schematic longitudinal cross-sectional view through a conventional optical fiber.

An optical fiber 10 is principally constructed in a way which is schematically shown in FIG. 1, namely with a core 11 made of a glass material, e.g. quartz, a cladding 12 of glass material or plastic, a cladding covering 13 of for example silicon rubber and an outer covering 14 of e.g. nylon, which gives an improved mechanical strength to the fiber 10. When high effects are to be transmitted through the fiber radiation leaking from the cladding out into the covering can damage the covering as was previously mentioned.

Figure 2:
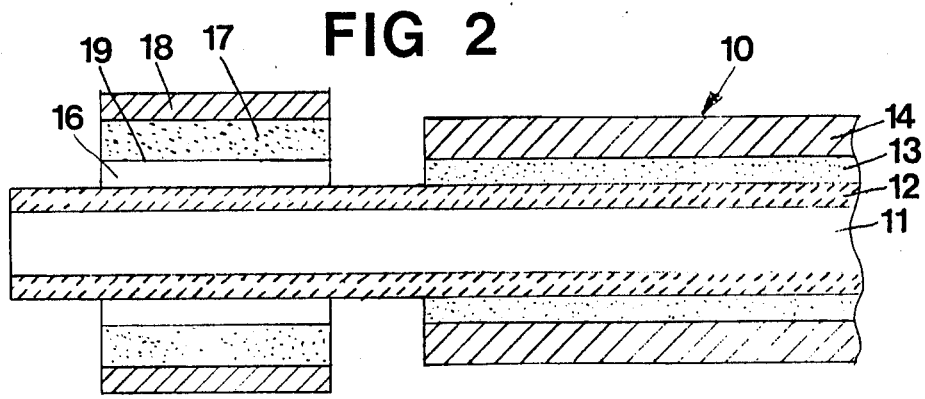
FIG. 2 is a view similar to FIG. 1 through an embodiment of the fiber according to the invention.

In order to avoid the absorbed power density in the covering from becoming too high the cladding 12 can, as shown in FIG. 2, be provided with a radiation resistant material 16 at least at the entrance side of the fiber. The radiation resistant material has a refractive index exceeding or approximately equal to the refractive index of the cladding so that the radiation in the cladding will be conducted out into the radiation resistant material 16.

The radiation resistant material 16 should be transmitting and therefore may be referred to as radiation resistant transmitting material which is intended to mean material which is not destroyed by the radiation and will transmit the radiation. In order to effectively conduct the produced heat away the radiation resistant material 16 should be in thermal contact with a good heat conductor 18. Examples of radiation resistant materials that may be used are glass materials and optic epoxy materials. A glass material suitable for this purpose is fused quartz.

Since the radiation resistant material 16 is transparant, the absorption must take place in material layers 17 or 18 outside the radiation resistant material 16. In order to make the radiation leave the radiation resistant material 16, its outer surface 19 can be made uneven so that the radiation is spread towards the surface, or inhomogeneities can be introduced into the radiation resistant material 16, or inhomogeneities can be introduced in a layer 7 located outside the radiation resistant material. The inhomogeneities should have a size dimension at least the size of the wavelength of the radiation in order to avoid reflection. If the inhomogeneities are smaller than the wavelength, the surface will be reflecting. The layer 17 should hve a refractive index close to that of the radiation resistant material 16 in order to make the reflection at the interfacial surface between the two materials small. A further way to conduct the radiation away from the radiation resistant material 16 is to apply a material 17 outside material 16 which has absorption, but which has a refractive index sufficiently close to that of the radiation resistant material so that the reflection in the interfacial surface between the two materials is small.

In all cases the layer in which the radiation is absorbed should be in good thermal contact with or consist of a heat conducting means in order to conduct away heat produced.

I claim:

1. In an optical fiber for transmitting high optical power having a central core portion adapted to conduct radiation, a cladding layer surrounding the core portion, and at least one covering surrounding the cladding layer and adapted to provide an improved mechanical stability to the fiber and to damp scattered radiation, the improvement for preventing the radiation level in any volume part of the covering from exceeding the limit at which the material of the covering is damaged comprising:
   a radiation resistant transmitting material arranged outside of and in contact with the cladding at least at an entrance side over a portion of the length of the fiber and having a real refractive index greater than or close to the refractive index of the cladding; and
   at least one additional material layer outside of said radiation resistant transmitting material, at least the outermost layer comprising a heat-conducting means in which the radiation is absorbed.
2. An optical fiber as claimed in claim 1 wherein:
   said radiation resistant transmitting material has an outer surface remote from the cladding provided with inhomogeneities having a size at least that of the radiation wavelength, so that radiation incident towards said outer surface can leak out through said outer surface.
3. An optical fiber as claimed in claim 1 wherein:
   a further material having a refractive index close to that of said radiation resistant transmitting material and containing inhomogeneities causing scattering of the radiation is arranged outside of and in contact with said radiation resistant transmitting material.
4. An optical fiber as claimed in claim 1 wherein:
   said radiation resistant transmitting material contains inhomogeneities causing scattering of the radiation.
5. An optical fiber as claimed in claim 1 wherein:
   said at least one additional material layer comprises a plurality of layers radially outwardly of said radiation resistant transmitting material, the outermost layer comprising a heat-conducting material in which the radiation is absorbed.
6. An optical fiber as claimed in claim 2 wherein:
   said at least one additional material layer comprises a plurality of layers radially outwardly of said radiation resistant transmitting material, the outermost layer comprising a heat-conducting material in which the radiation is absorbed.
7. An optical fiber as claimed in claim 3 wherein:
   said at least one additional material layer comprises a plurality of layers radially outwardly of said radiation resistant transmitting material, the outermost layer comprising a heat-conducting material in which the radiation is absorbed.
8. An optical fiber as claimed in claim 4 wherein:
   said at least one additional material layer comprises a plurality of layers radially outwardly of said radiation resistant transmitting material, the outermost layer comprising a heat-conducting material in which the radiation is absorbed.

* * * * *